US007275293B2

(12) United States Patent
Wathey

(10) Patent No.: US 7,275,293 B2
(45) Date of Patent: Oct. 2, 2007

(54) FUEL LINE ASSEMBLY TOOL

(75) Inventor: Joseph Wathey, Barberton, OH (US)

(73) Assignee: S.U.R. & R. Auto Parts Inc., Akron, OH (US)

( * ) Notice: Subject to any disclaimer, the term of this patent is extended or adjusted under 35 U.S.C. 154(b) by 624 days.

(21) Appl. No.: 10/913,165

(22) Filed: Aug. 6, 2004

(65) Prior Publication Data

US 2006/0191593 A1 Aug. 31, 2006

Related U.S. Application Data

(60) Provisional application No. 60/575,069, filed on May 27, 2004, provisional application No. 60/493,863, filed on Aug. 8, 2003.

(51) Int. Cl.
*B23P 19/04* (2006.01)

(52) U.S. Cl. ........................... 29/237; 29/242; 29/243; 29/244; 29/270; 29/281.1; 29/284

(58) Field of Classification Search ............... 29/213.1, 29/219, 234, 237, 242, 243, 244, 267, 270, 29/271, 272, 281.1, 281.5, 284; 269/3, 6
See application file for complete search history.

(56) References Cited

U.S. PATENT DOCUMENTS 4,081,112 A * 3/1978 Chang ........................ 222/391
6,658,711 B1 * 12/2003 Benson ........................ 29/237

* cited by examiner

*Primary Examiner*—Jermie E. Cozart
(74) *Attorney, Agent, or Firm*—Sand & Sebolt

(57) ABSTRACT

A fuel line assembly tool and method for repairing or creating replacement fuel lines. An exemplary embodiment of this tool uses a squeeze operated plunger to insert a fitting into a length of synthetic flexible tubing by holding the parts and plunger in alignment for accurate and direct insertion. Another exemplary embodiment uses specially adapted fittings assembled in a kit for use in creating replacement fuel lines.

6 Claims, 10 Drawing Sheets

FUEL LINE ASSEMBLY TOOL

TECHNICAL FIELD

This invention relates generally to automotive repair. Specifically, this invention relates to a tool and a method for assembling fuel line replacement parts so that individual owners or automotive mechanics can easily repair or manufacture and replace fuel lines.

BACKGROUND ART

The fuel lines in most automobiles require periodic replacement. Owners and automotive mechanics have few good options for replacing such fuel lines. One option for replacing worn out or damaged parts is to purchase a replacement part from the original manufacturer. In general, replacement parts from original manufacturers are relatively more expensive than corresponding parts that are available on the secondary market. In the case of fuel lines, this tendency is exacerbated because there is not a well developed secondary market supply. Without competition, the original manufacturer is free to keep costs relatively high. In addition, there is little motivation to continue manufacturing replacement fuel lines for older or less popular vehicles, for which the demand is significantly less. Such replacement fuel lines may, in some instances, be unavailable at any cost.

A second option is to use a length of replacement fuel line, and to attach it directly using clamps or other unwieldy means. Complicating this process is the fact that many fuel lines are made of metal tubing. Metal tubing is difficult to bend to a shape that will fit properly. Although some such metal tubing is designed to be flexible, it is not always as flexible as is necessary for easy assembly. In addition, metal tubing tends to rust out over time, and must be replaced more frequently than synthetic tubing.

Synthetic flexible tubing, most often nylon, and appropriate burr type fittings that mate tightly with the flexible tubing are often available. The nature of this synthetic tubing resolves both the rust and flexibility problems, but there is currently no easy way to insert such fittings into the flexible tubing. Instructions provided by the manufacturer of such tubing generally include boiling the tubing for a few minutes, then holding the hot tubing steady while trying to force a burred fitting into the tubing. Because the burred fitting has an external diameter which is larger than the internal diameter of the tubing, the forced insertion often results in frustration or failure.

A third option is to salvage a fuel line from a vehicle of the same make, model, and year which is no longer fit for driving. It is not necessarily easy to locate a matching vehicle, and when a match is located the condition of the fuel line may be in as poor condition as the salvage vehicle from which it is obtained.

In general, whether a fuel line is replaced using clamps and lengths of flexible tubing, by manually assembling a fitted fuel line, or by using a fuel line from a salvage vehicle this task can be difficult to complete properly and may result in relatively high professional fees and/or a leaky fuel line, which creates a safety hazard. In addition, some fuel lines have minor leaks that could be repaired, rather than replaced, if the appropriate and easily assembled components were readily available.

Thus, there is a need to provide individuals and those involved in automotive repair with an inexpensive and easy alternative to the present options for fuel line replacement.

DISCLOSURE OF INVENTION

It is an object of an exemplary form of the present invention to provide a tool for attaching fittings to flexible tubing.

It is a further object of an exemplary form of the present invention to provide a compact handheld tool for attaching fittings to flexible tubing.

It is a further object of an exemplary form of the present invention to provide a tool for attaching fittings to flexible tubing which tool applies in-line force to insert the fitting into flexible tubing.

It is a further object of an exemplary form of the present invention to provide a tool for attaching fittings to flexible tubing which tool can be made from a caulking gun.

It is a further object of an exemplary form of the present invention to provide fittings that more easily fit into flexible tubing, which fittings seal tightly with the flexible tubing, and which can be inserted with or without an attachment tool.

It is a further object of an exemplary form of the present invention to provide a kit containing all of the components needed for the assembly of replacement fuel lines, or for the repair of existing ones.

It is a further object of an exemplary form of the present invention to provide a simplified method of repairing or assembling replacement fuel lines.

It is a further object of an exemplary form of the present invention to provide a means to use flexible tubing to replace less flexible original tubing.

Further objects of an exemplary form of the present invention will be made apparent in the following Best Modes for Carrying Out Invention and the appended claims.

The foregoing objects are accomplished in an exemplary embodiment of the invention by a tool which grips a portion of fuel line, maintains alignment between the fuel line portion and a fitting, and inserts a fitting into a fuel line by an in-line application of force. In an exemplary form discussed in more detail below, once the fitting and fuel line are initially aligned in the tool, the tool can be operated by a single-handed squeezing action. Such an exemplary tool can be used with a variety of diameters of flexible tubing, can insert a variety of fittings, and is thus capable of creating aftermarket replacement fuel lines for a variety of vehicles, which replacement fuel lines are easy to install and to disconnect later if necessary.

The foregoing objects are further accomplished in another exemplary embodiment of the invention by a collection of fuel line assembly components, including push on quick release fittings that are specially adapted for easy insertion into flexible tubing.

The foregoing objects are further accomplished by a method of using such a collection of components and tools to repair or manufacture replacement fuel lines for use in fuel line maintenance.

Thus the fuel line assembly tool and method achieves the above stated objectives, eliminates difficulties encountered in the use of prior methods, solves problems, and attains the desirable results described herein.

BEST MODES FOR CARRYING OUT INVENTION

Figure 1:
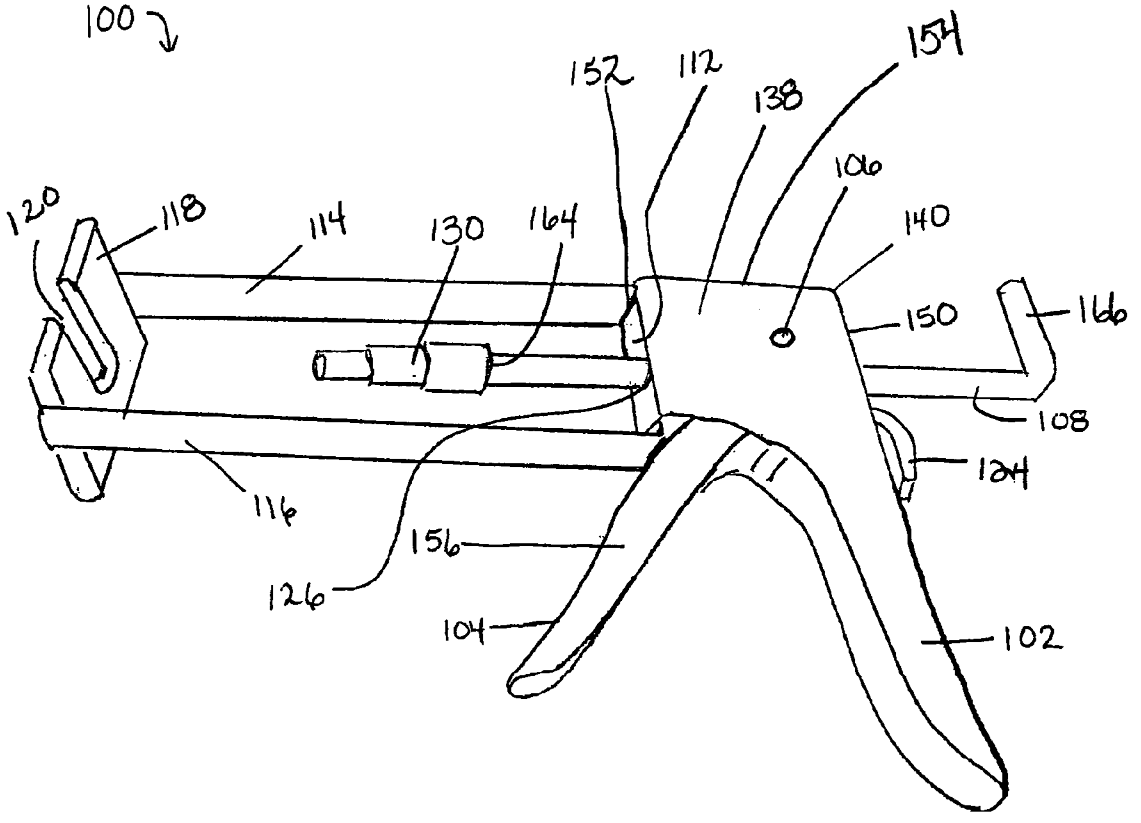
FIG. 1 is a perspective view of an exemplary fuel line assembly tool.

Referring now to the drawings, and in particular to FIGS. 9-13, shown therein are exemplary embodiments of the components necessary to create replacement fuel lines, or to repair existing ones. In an exemplary embodiment, illustrated in FIGS. 9 and 10, the components an automobile owner or a mechanic may need for fuel line replacement or repair are assembled in a kit 500. Kit 500 comprises a box 510 having a lower tray 520, and an upper tray 530. In an exemplary embodiment, one or both of upper and lower trays 530, 520 may be partitioned into several discrete compartments 540. In the exemplary embodiment illustrated, the upper and lower trays 530, 520, and the lid are coaxially hinged, and the box is molded to form a carrying handle. In other embodiments, the configuration may be different. For example, the upper tray may be completely removable from the box or the lower tray may hold the fittings and the upper tray the flexible tubing. In still other embodiments, there may be a single layer, or more than two layers.

Figure 9:
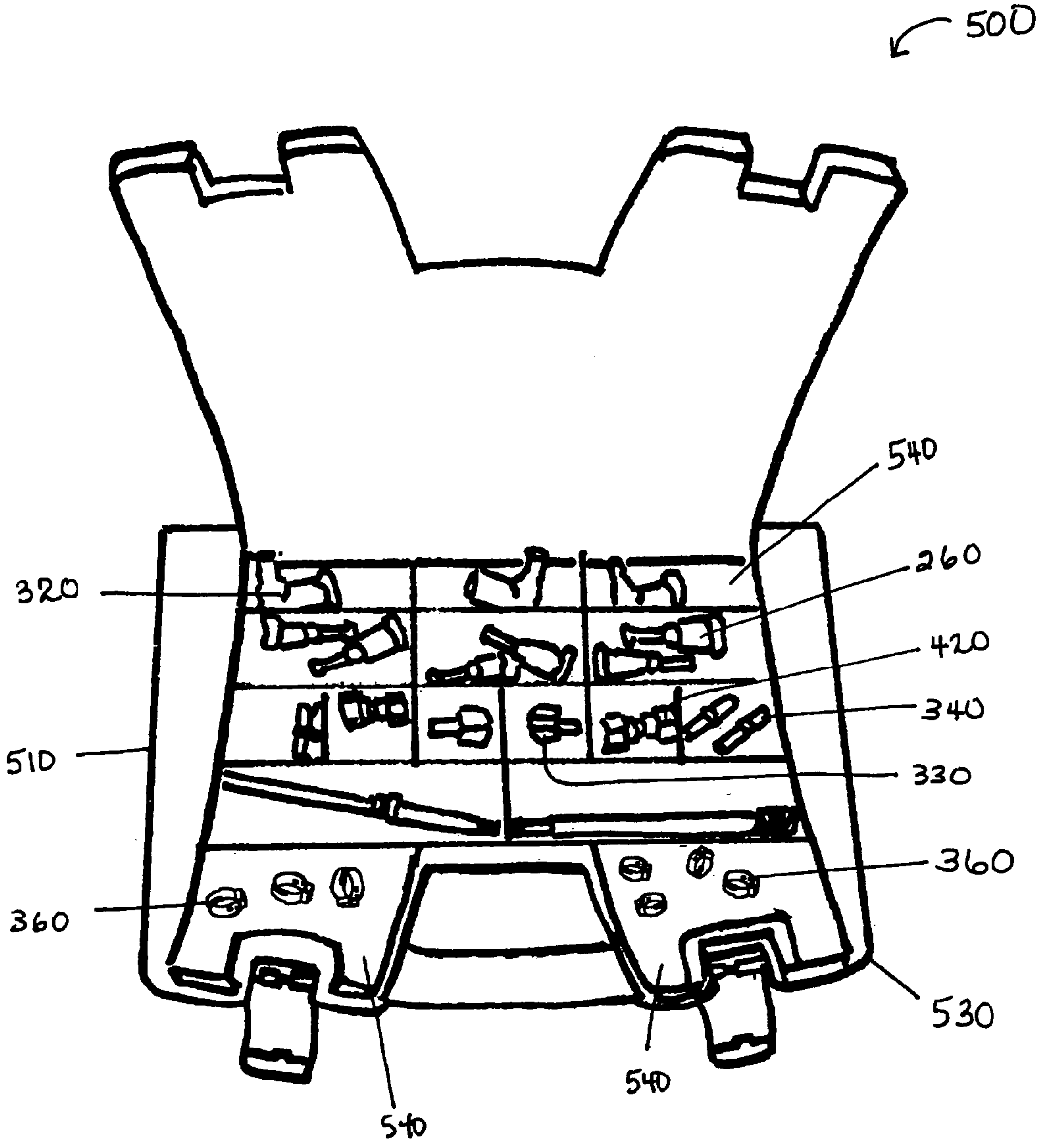
FIG. 9 is a perspective view of an upper tray of an exemplary fuel line replacement and repair kit.
Figure 10:
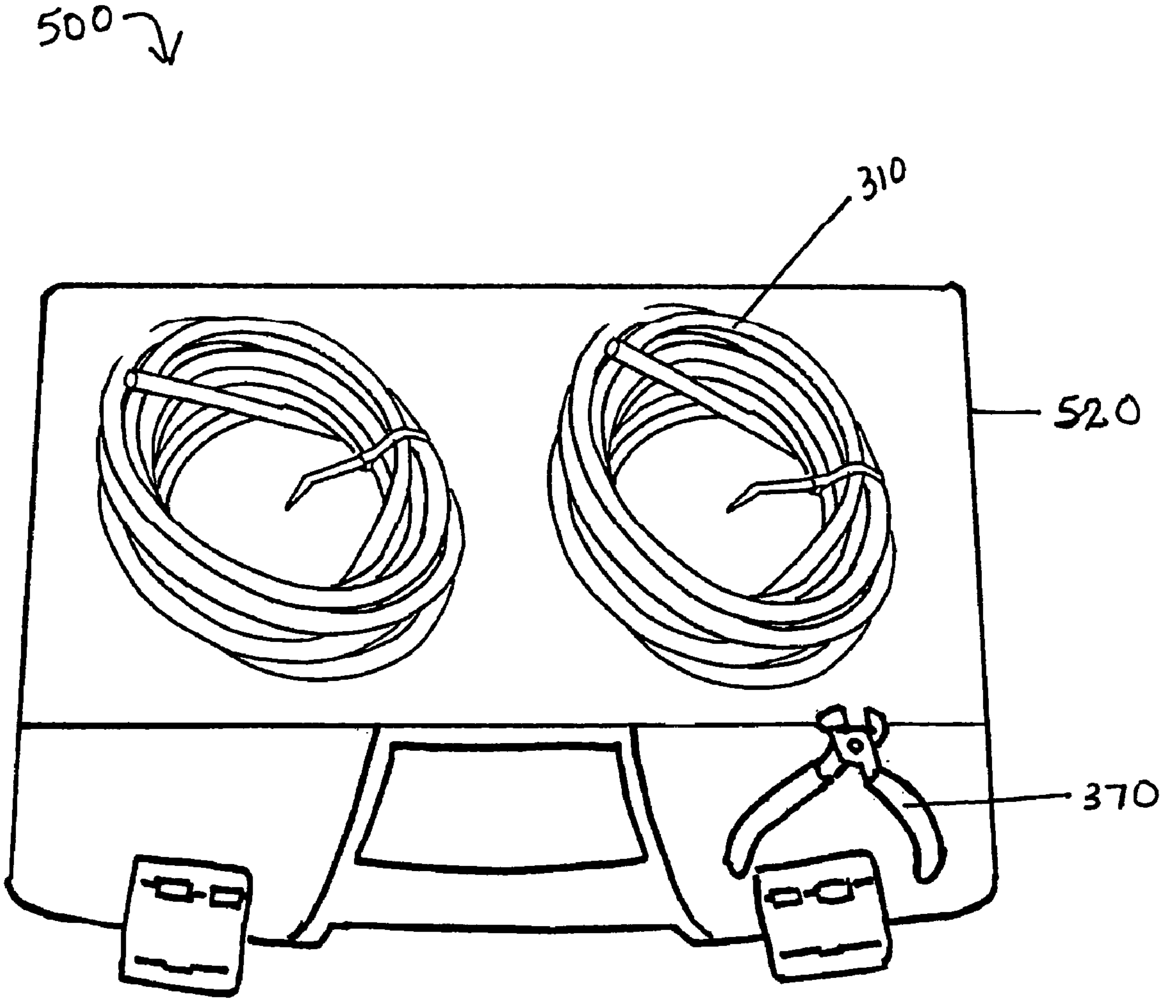
FIG. 10 is perspective view of a lower tray of a fuel line replacement and repair kit.

In the exemplary embodiment illustrated in FIG. 9, the compartments 540 in the upper tray 530 may contain quick disconnect fittings 250, 260, connecting barbs 340, threaded adapters 330, angled fittings 320, compression fittings 420, metal to flexible tubing adaptors 350, and hose clamps 360 in sizes adapted to fit the flexible tubing 310 contained in the lower tray 520.

In an exemplary embodiment, the lower tray 520 may contain lengths of flexible tubing 310. For purposes of example and not limitation, flexible tubing 310 made from nylon having a diameter of 0.25" through 0.375" is generally appropriate to use in making replacement fuel lines. In addition, the lower tray 520 may include a fuel line assembly tool 100, or a hose clamp crimping tool 370. These items are discussed in more detail below. For purposes of illustration and not limitation, clamps and crimping tools for flexible tubing are commercially available, such the Stepless Clamps for Vinyl Hose and the Crimper Tool For Stepless Clamps, available from BeverageFactory.com. Other suitable clamps, which may not require a separate crimping tool, will be readily known to those skilled in the art. Although in this exemplary embodiment, a particular selection of adaptors and fittings is suggested, additional or different adaptors and fittings may be appropriate or necessary to include, based on the type of pre-existing fittings the user is likely to encounter.

Figure 5:
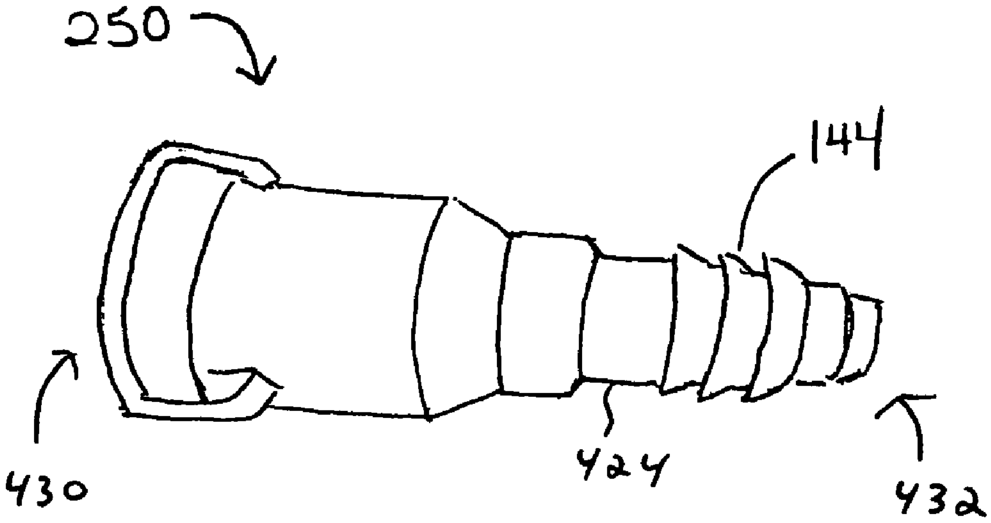
FIG. 5 is a view of a fitting.

Fuel lines generally require a length of tubing with connectors or adaptors at each end. One common type of connector is a barbed quick disconnect fitting 250. FIG. 5 illustrates one such exemplary fitting 250, which is readily commercially available. Such a fitting 250 comprises a first and second end 430, 432. The first end 430 comprises a hollow, roughly conical portion having a quick release feature on its interior surface which is adapted to mate with the original automotive connection for the fuel line. The second end 432 comprises a barbed connection 144 comprised of a hollow generally cylindrical extension 424 from the first end 430, having series of annular protrusions or barbs on the exterior surface of the second end 432. Such a barbed connection 144, as noted above, is generally extremely difficult to insert into flexible tubing 310, but such insertion may be easily accomplished using the fuel line assembly tool 100 described below. Quick disconnect fittings having barbed connections 144 may also be angled in a manner similar to the angled push on quick release fitting 320 illustrated in FIG. 9. The angle shown, approximately a right angle, is provided for illustration purposes only because it is the most common angle. In some instances, however, a different angle may be useful and those skilled in the art will recognize that such different angles are still within the scope described herein.

Figure 8:
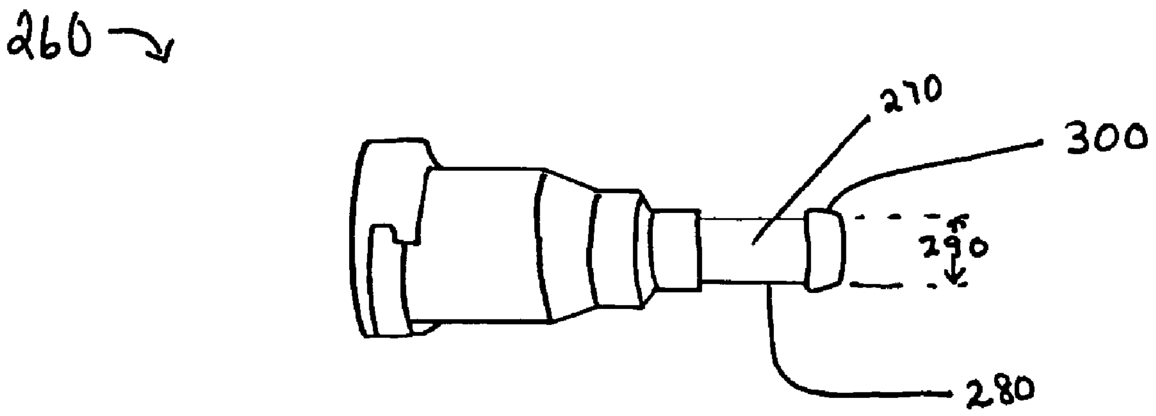
FIG. 8 illustrates an exemplary push on quick disconnect fitting.

As an alternative to using barbed fittings, push on quick disconnect fittings 260 may be used with hose clamps 360 to provide an equivalent replacement fuel line. Exemplary push on quick disconnect fittings 260 are illustrated in FIG. 8. In an exemplary embodiment of a quick disconnect fitting 260, the barbed connecting portion 144 of a readily available barbed quick disconnect fitting 250 is replaced by a connecting portion 270 having a cylindrical extension 280 of approximately constant diameter 290, terminating in enlarged annular portion 300. The diameter 290 of the cylindrical extension 280 is approximately the same as the diameter of the flexible tubing 310 into which it is to be inserted, and the diameter of the annular portion 300 is slightly larger than the diameter of the flexible tubing 310 into which it is to be inserted.

Figure 11:
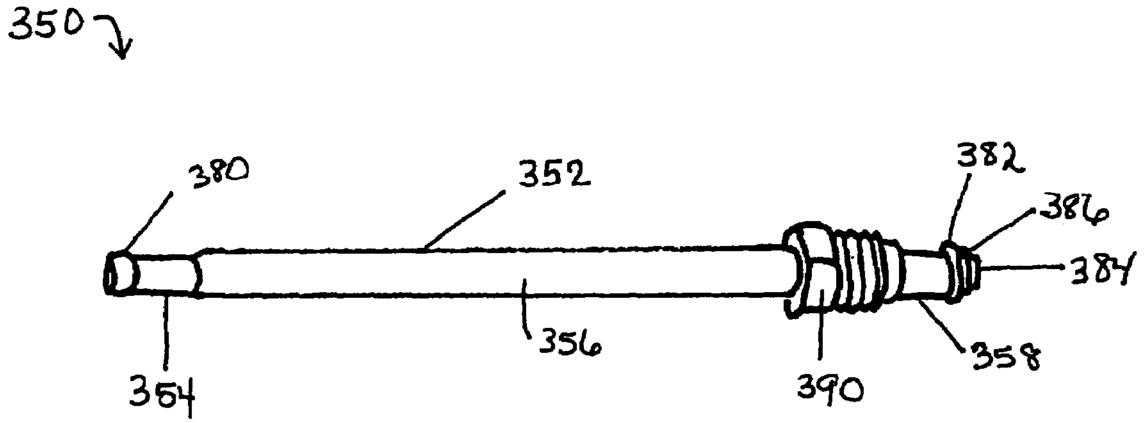
FIG. 11 is an exemplary view of a flexible tubing to metal adaptor.
Figure 12:
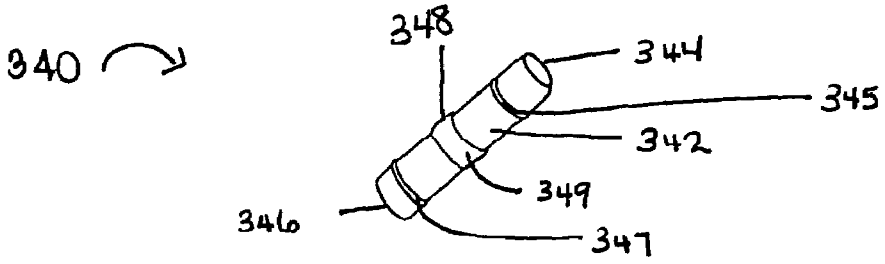
FIG. 12 is an exemplary connector barb.

Depending on the original connections in the fuel line to be replaced, additional fittings or adaptors may also be required. One exemplary embodiment of a different fitting is illustrated in FIG. 11. A metal to flexible tubing adapter 350 comprises a hollow cylindrical portion of metal tubing 352 having a first end 354, a middle portion 356, and second end 358. In an exemplary embodiment of an adaptor 350, a middle portion 356 has a diameter that is approximately the same as the diameter of flexible tubing to which it is to be attached. A first end 354 has a narrower diameter than the middle portion 356, and terminates in an annular portion 380 with approximately the same diameter as the middle portion 356. In an exemplary embodiment, a second end 358 includes a narrow annular lip 382. Extending from the lip 382, on the side opposite the middle portion 356, is a cylindrical extension 384. The exemplary cylindrical extension 384 may be adapted to seat an 0-ring seal 386 against the annular lip 382. Surrounding a line adaptor is a coaxially hollow nut 390, which includes external threading to mate with the original automotive fitting. The cylindrical extension 384 is adapted to be bent, if desired, for use in the vehicle to which it is to be attached.

Figure 13:
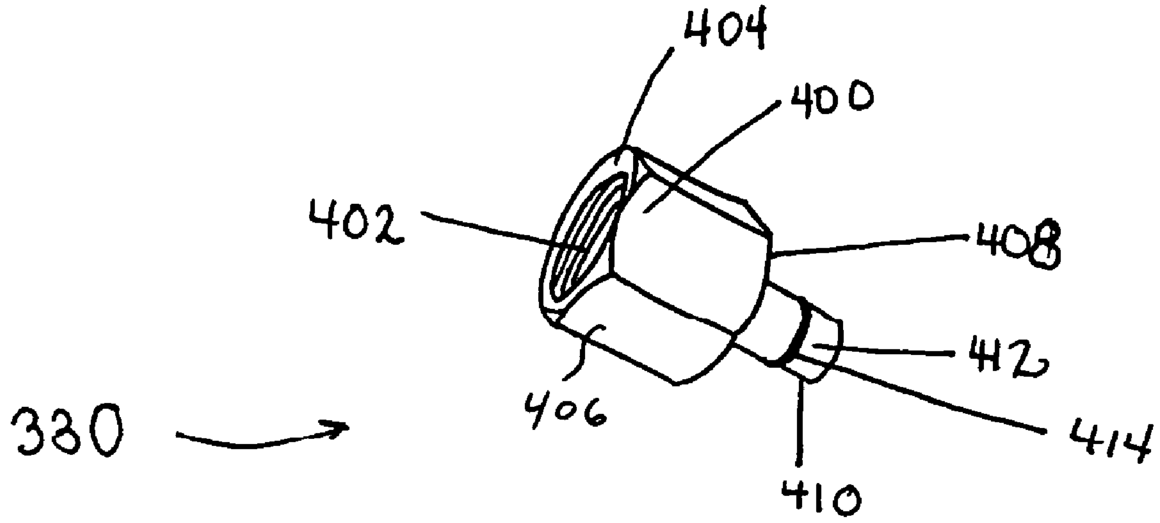
FIG. 13 is an exemplary female connection fitting for use with flexible tubing.

Another exemplary fitting 330, illustrated in FIG. 13, is adapted to permit flexible tubing 310 to be used in place of a steel fuel line, or a portion thereof, which includes female, internally threaded, adapter which mates with the original automotive fitting on some vehicles. Such an exemplary fitting 330 has first and second parts. A first part 406 comprises an internally threaded cap 402 having an open first end 404, a hexagonal exterior surface 400, and a second end 408 which is closed but for a small centrally located hole. A second part 410 comprises a hollow cylindrical extension 412 from the center of the second end 408, which adapted to create a single opening from the first end 404 of the cap 402 completely through the cylindrical extension 412. The exterior of the cylindrical extension 410 may have a diameter approximately the same as the interior diameter of the flexible tubing 310 into which it is to be inserted. The exterior surface of the cylindrical extension 412 may also have an annular portion 414 which has a slightly larger diameter than the diameter of the cylindrical extension 412.

Another exemplary fitting, a barbed connector 340, is adapted to connect two portions of flexible tubing 310. This connector 340 comprises a hollow, cylinder 342 having first and second ends 344, 346 and a middle 348. The cylinder 342 has an exterior diameter that is approximately the same as the interior diameter of the flexible tubing 310 portions to be connected together. The exemplary connector 340 also has three annular portions 345, 347, 349, each having a slightly larger diameter than the cylinder 342, with one annular portion located on each of the first and second ends 344, 346, and the middle 348.

Another exemplary fitting 420 comprises joined compression fittings, one adapted for metal tubing and one adapted for flexible tubing. Such compression fittings are well known to those skilled in the arts. Such a fitting 420 may be used to sealingly join a portion of metal tubing to a portion of flexible tubing.

Figure 3:
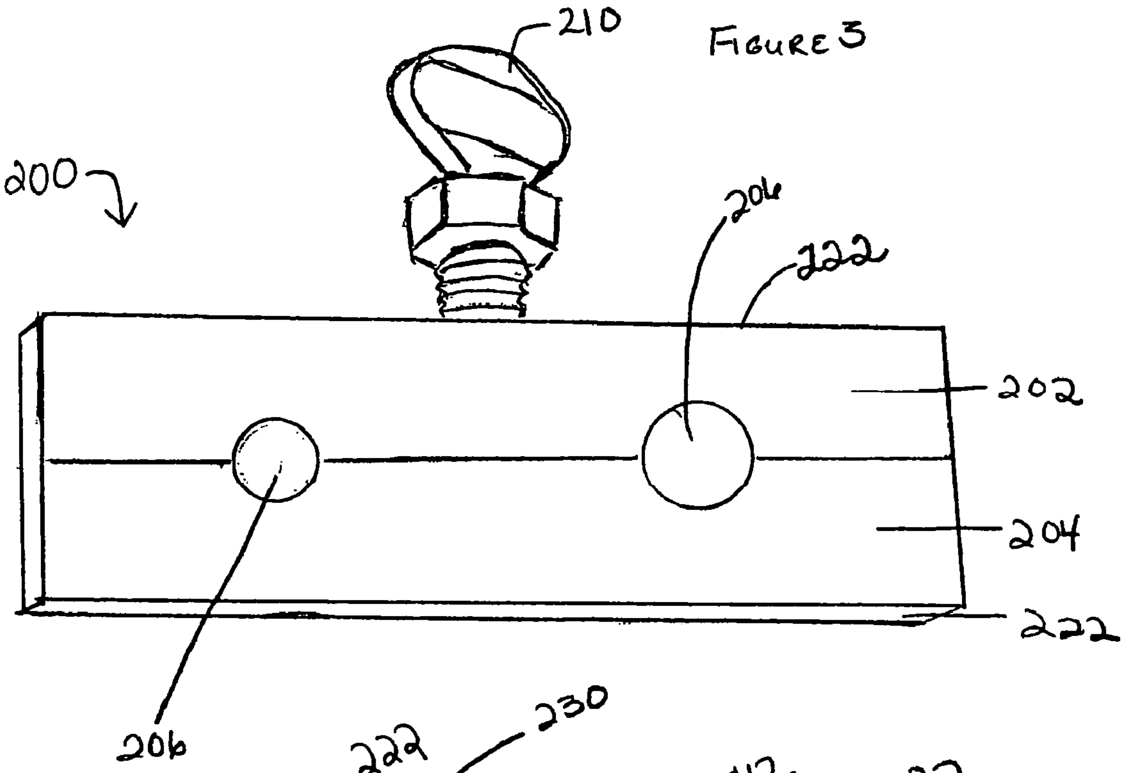
FIG. 3 is front view of a closed clamp.

As noted above, standard quick release fittings 250 are generally very hard to insert into flexible tubing. FIG. 1 illustrates an exemplary fuel line assembly tool 100 which can be used to simplify the task. The fuel line assembly tool 100 illustrated in exemplary fashion in FIG. 1 comprises a handle portion 140, a trigger 104, a plunger 108, an insert guide 130 attached to plunger 108, a brace 118, rails 114, 116 connecting the handle portion 140 to the brace 118, and a clamp 200 (illustrated in FIG. 3).

The exemplary handle portion 140, trigger 104, rails 114, 116, and plunger 108 illustrated in FIG. 1 resemble the handle, trigger rails, and plunger of commercially available caulking guns in form and operation. One such caulking gun is described in U.S. Pat. No. 4,081,112, the specification of which is incorporated herein by reference.

Figure 2:
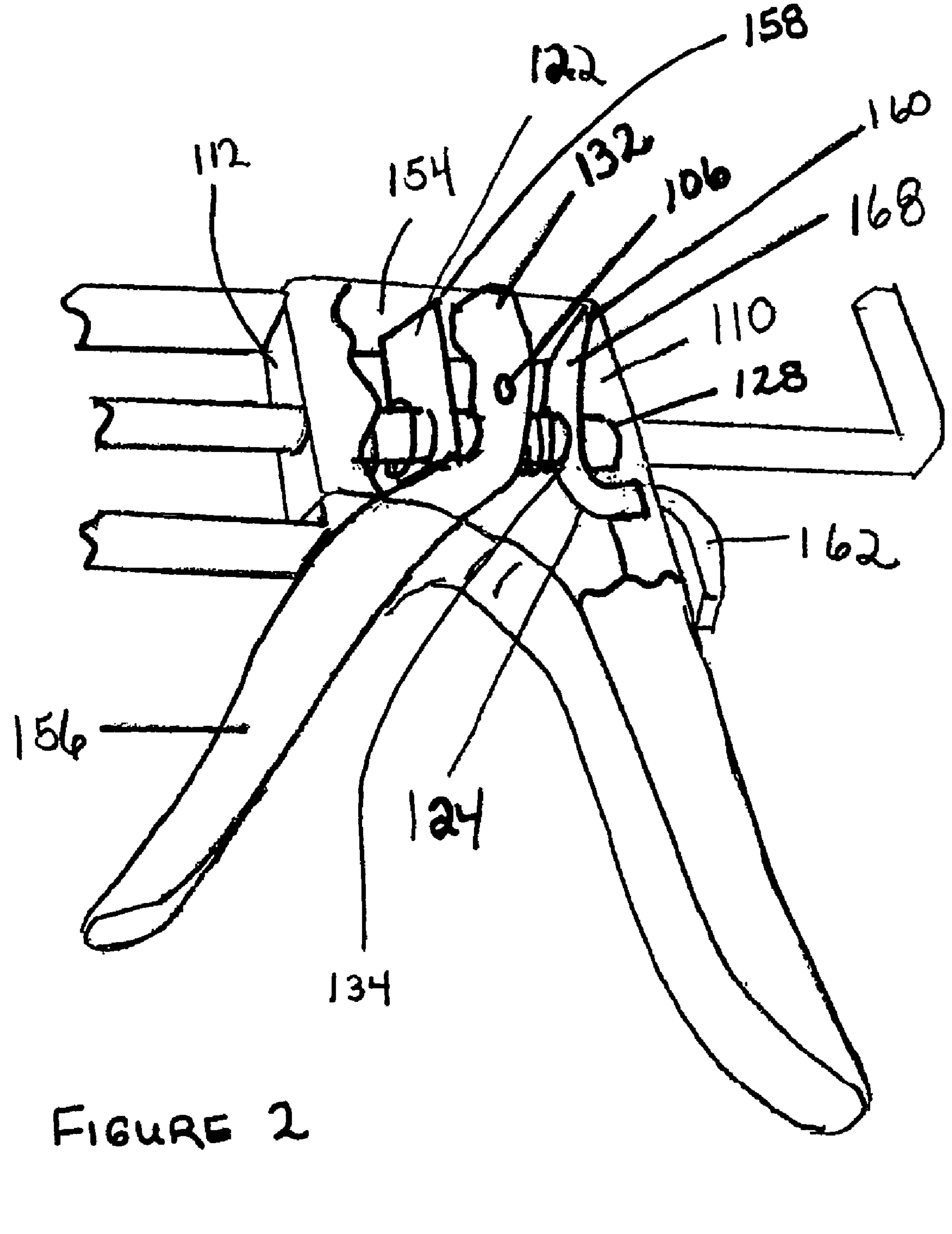
FIG. 2 is a cutaway drawing of an exemplary handle portion of a fuel line assembly tool.

In the exemplary fuel line assembly tool 100 illustrated, the handle portion 140 comprises a boxlike portion 138 with a first side 150 extending in an elongated grip 102. A trigger 104 comprises an elongated lever 156, which is pivotally connected to the boxlike portion 138 of the handle portion 140 at a pivot point 106. As illustrated in FIG. 2, a trigger may have a pushing tip 132 on the portion of the trigger 104 that is on the opposite side of the pivot point 106 from the lever 156. In an exemplary embodiment, the first side 150 of the boxlike portion 138 of the handle portion 140 comprises a first guide plate 110, and the opposite generally parallel side of the boxlike portion 138 of the handle portion 140 comprises a second guide plate 112, visible in FIG. 2. A third side 154 of the boxlike portion 138 of the handle portion 140, opposite the grip 102, extends generally perpendicularly between the first side 150 and the second side 152 of the boxlike portion 138 of the handle portion 140. In this exemplary embodiment, the third side 154 is open and is identified primarily to provide a point of reference. Each guide plate 110, 112 includes a generally central guide hole 128, 126 located an equal distance from the third side 154 of the handle portion 150. Guide hole 128 is identified in FIG. 2. In the exemplary embodiment illustrated, a rod-like plunger 108 passes through the guide holes 126 and 128 of the handle portion 140. The plunger 108 has a second end 164, which protrudes through the second guide plate 112 and a first end 166, which protrudes through the first guide plate 110.

As illustrated in cutaway in FIG. 2, the plunger 108 also passes through a gripping element 158. The gripping element 158 may comprise one or more plates 122 biased away from the second guide plate 112 and toward a pushing tip 132. In the exemplary embodiment illustrated, one or more plates 122 may each contain a hole through which the plunger 108 passes. When the trigger 104 is squeezed toward the grip 102, the pushing tip 132 presses the plates 122 toward the second guide plate 112. The friction between the edges of the holes in the plates 122 and the plunger 108 initially keeps the holes fixed relative to the plunger 108 while the end of the plates 122, which are in contact with the pushing tip 132 are moved toward the second guide plate 112. As the angle between the plates 122 and the plunger 108 deviates farther from perpendicular, the friction increases, and the plunger 108 is moved toward the second guide plate 112. When the trigger 104 is released, the angle between the plates 122 and the plunger 108 returns to approximately perpendicular, and the biasing force slides the plates 122 along the plunger 108 away from the second guide plate 112.

The handle portion 140 may further include a release 124. An exemplary release 124 is illustrated in FIG. 2. The exemplary release 124 illustrated comprises a lever 168 curved concavely away from the inside of the first guide plate 110 and having a first end 160 and a second end, release tab 162. The first end 160 may pivot against the first guide plate 110 near the third side 154 of the boxlike portion 138 of the handle portion 140. The release tab 162 may protrude through the first guide plate 110. In the exemplary embodiment illustrated, the second end of the lever is biased toward first guide plate 110, and the end of release tab 162 of the release 124 partially extends through the handle 102.

In the exemplary embodiment illustrated the plunger 108 passes through a hole in the release 124. A hole 134 in the release 124 is of a size and location so that when the release 124 is completely biased toward the first guide plate 110, the friction between the sides of the hole 134 and the plunger 108 keep the plunger 108 fixed in position. When the release tab 162 is pressed toward the grip 102, counteracting the bias of the release 124, the hole 134 aligns more completely with the plunger 108, which decreases the friction between the plunger 108 and the release 124 and permits the plunger 108 to be moved.

Although the embodiment illustrated in FIGS. 1 and 2 is described as having a specific shape, and a specific mechanism for advancing a plunger toward a brace is described herein, other embodiments will be obvious to those skilled in the art. Any apparatus which advances a plunger through openings in a trigger and handle by squeezing the trigger toward the handle are within the scope of the fuel line assembly tool described herein.

Attached to the second end 164 of a plunger 108 is an insert guide 130. The exemplary insert guide 130 illustrated in FIG. 1 comprises three solid cylinders each having a different radius but equivalent length affixed coaxially end to end in order of descending radii. Although in the exemplary embodiment illustrated in FIG. 1 the insert guide 130 comprises three solid cylinders, in other embodiments it may comprise fewer or more solid cylinders, each having a different radius. In still further embodiments, the insert guide 130 may comprise a different shape, so long as the external shape of the insert guide 130 is adapted to fit the interior of a fitting 250, 260 to provide a solid seat for the fitting 250 as it is being pressed into the flexible tubing 310.

In the exemplary embodiment illustrated, the base of the largest cylinder is semi-permanently affixed coaxially to the second end 164 of plunger 108. In other embodiments, the insert guide 130 and the second end 164 of plunger 108 may be adapted to releasably mate. One exemplary illustration of an embodiment of this type might include machined threading on the exterior of the second end 164 of plunger 108 and on the interior end of insert guide 130. Such a relationship would permit one insert guide 130 to be removed and another insert guide 130 to be substituted therefor. Other releasably mating means by which two metal objects may be attached together will be obvious to those skilled in the art, and such means are within the scope of the fuel line assembly tool 100 described herein.

The fuel line assembly tool 100 further comprises a brace 118. In the exemplary embodiment illustrated, the brace 118 is a rectangular plate with one dimension equivalent to the length of the second guide plate 112, measured from the edge adjacent to the third side 154 of the handle portion 102 to the opposite edge. In an exemplary embodiment, the brace 118 includes a U-shaped notch 120 removed from one edge of the brace 118. Although in this exemplary embodiment, a brace 118 is a rectangularly shaped plate having a notch in one edge, in other embodiments a brace 118 may have a different shape, such as for example that of a circular plate. In still further embodiments, a brace 118 may include more than one notch, or one or more of such notches may have a different shape, so long as a portion of the notch can accommodate a flexible tubing 310 and permits such flexible tubing 310 to be aligned with a plunger 108.

In the exemplary embodiment illustrated, the brace 118 is affixed to the handle portion 140 of the fuel line assembly tool 100 by means of elongated rectangular rails 114, 116. In the exemplary embodiment illustrated, the rails 114, 116 are fixedly attached at one end to the opposing edges of the brace 118 which are adjacent to the side containing notch 120. The second end of rails 114, 116 are fixedly attached to the edge of second guide plate 112 which is adjacent to the third side 154 of the handle portion 102 and to the opposite edge of second guide plate 112. In this exemplary embodiment, the brace is fixedly attached to rails 114, 116; in other embodiments, the brace 118 may be removably attached to rails 114, 116.

Figure 4:
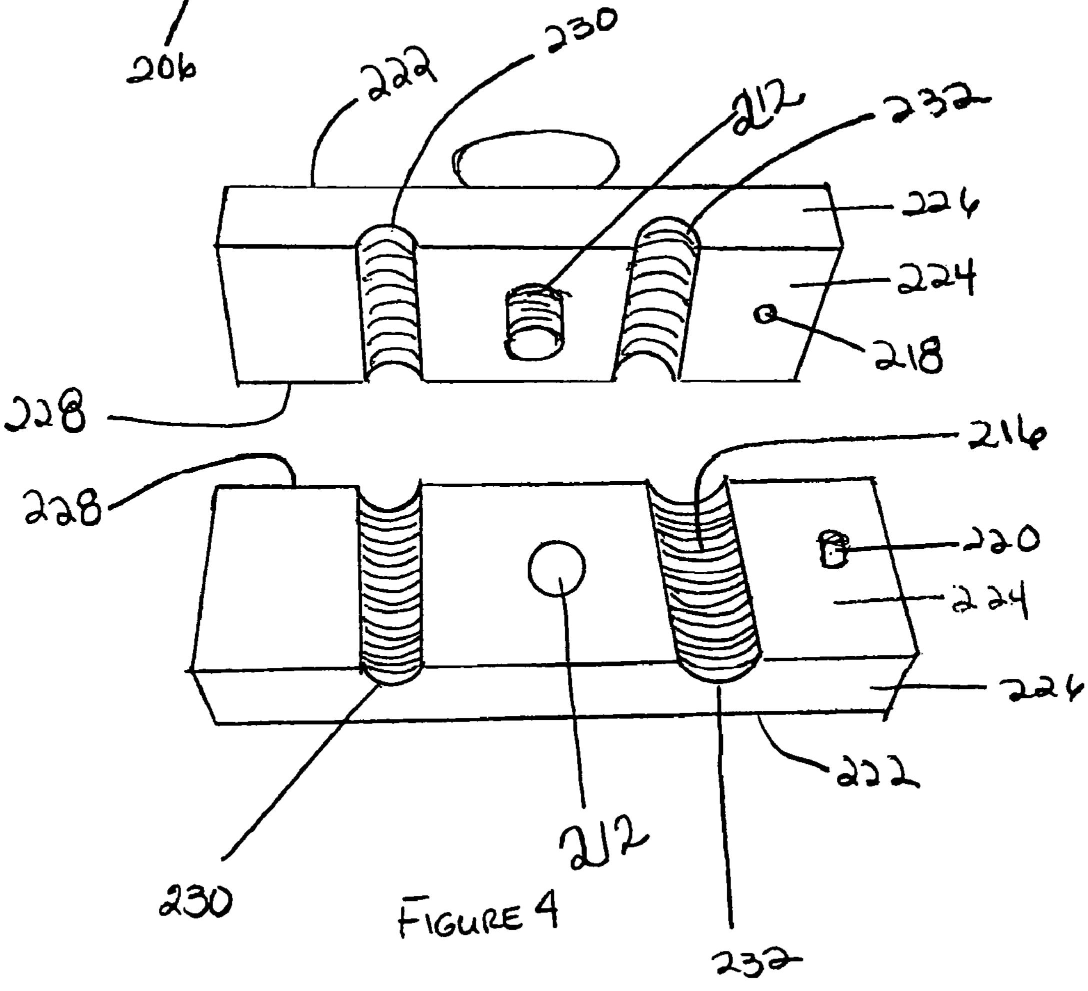
FIG. 4 is an exploded perspective view of an open clamp.

The fuel line assembly tool 100 further includes a clamp 200. In the exemplary embodiment illustrated in FIGS. 3 and 4, a clamp 200 comprises two rectangular blocks 202, 204. Blocks 202 and 204 each have parallel opposing first and second faces 222, 224 and parallel opposing third and fourth faces 226, 228 which faces are perpendicular to the first and second faces 222, 224. In the exemplary embodiment illustrated, blocks 202 and 204 each include a central threaded hole 212 from the first face 222 to the second face 224. In addition, the second face 224 of block 204 includes an alignment reference 220, and the second face 224 of block 202 includes a mating alignment reference 218. In the exemplary embodiment illustrated, the mating alignment references 218, 220 are a peg and a cavity of equivalent dimensions. The alignment references 218, 220 are positioned so that when the second faces 224 of blocks 202, 204 are placed against each other, the central holes 212 of both blocks 202 and 204 are aligned and the alignment references 218, 220 are mated, and the blocks 202, 204 form a single rectangular block. When properly aligned, blocks 202, 204 may be fastened together by threading a thumb screw 210 through the central holes 212.

In the exemplary embodiment illustrated, the clamp 200 has a rectangular solid shape. In other embodiments the clamp 200 may have different shapes, such as cylindrical, triangular, or irregular, so long as the shape of the closed clamp is adapted to be seated against the brace 118 while the clamp 200 holds the flexible tubing 310 in place in resistance to the pressure of the plunger 108 and permits the alignment of the flexible tubing 310 with the plunger 108 and a fitting 250, 260. In further embodiments, a clamp. 200 may be integrated with a brace 118, so that the clamp 200 is removably attached to rails 114, 116 and functions in a self-bracing manner.

In the exemplary embodiment illustrated, the second faces 224 of blocks 202 and 204 each includes two half cylindrical grooves 230, 232 extending perpendicularly from the third face 226 to the fourth face 228. The grooves 230, 232 are placed so that when the second faces 224 of blocks 202, 204 are aligned to form a single larger block in the manner described above, the grooves 230 form one cylindrical passage, gripping hole 206, through the larger block, and the grooves 232 form a second cylindrical passage, gripping hole 206, through the larger block. In this exemplary embodiment, the radius of half cylindrical groove 230 is different from the radius of half cylindrical groove 232, creating gripping holes 206 of different radii. In the exemplary embodiment illustrated, a clamp 200 includes two gripping holes 206. In other embodiments, a clamp 200 may include fewer or more than two gripping holes 206, each having different radius, in order to accommodate a plurality of different sizes of flexible tubing 310. In other embodiments, the gripping holes may have the same radii, to facilitate rapidly preparing multiple replacement fuel lines of a single type. In an exemplary embodiment, the surface of each groove 230, 232 comprises a friction feature 216. In the exemplary embodiment illustrated, the friction feature 216 comprises ridges roughly perpendicular to the direction of the grooves 230, 232. Other exemplary embodiments of the friction feature 216 include a rubber insert, or a surface roughened in some manner other than by ridges.

Figure 6:
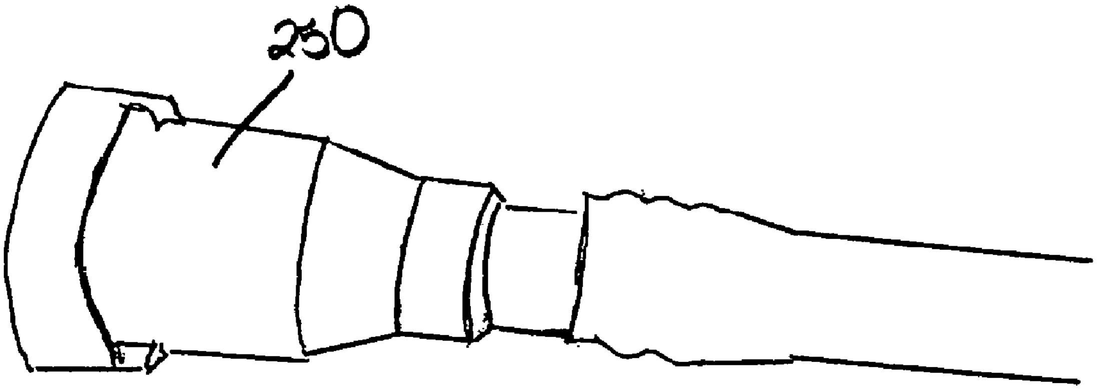
FIG. 6 is a view of a portion of fuel line with an inserted fitting.
Figure 7:
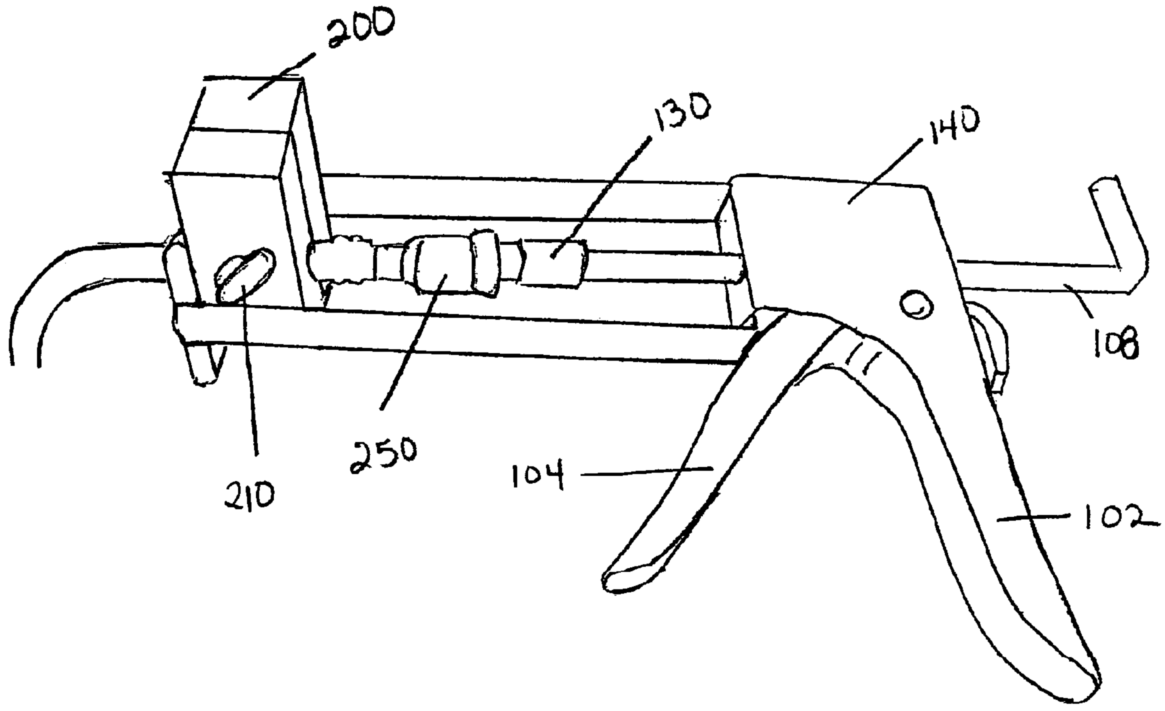
FIG. 7 is a perspective view of a fuel line assembly tool with a clamp and portion of assembled fuel line and fitting.

A replacement fuel line may be made from flexible tubing 310 and appropriate quick disconnect fittings 250, a portion of which is illustrated in FIG. 6. The end of the flexible tubing 310 may be cut perpendicularly to the flexible tubing 310. As illustrated in FIG. 7, the flexible tubing 310 may be gripped by a clamp 200, by inserting the flexible tubing 310 through a gripping hole 206 in the clamp 200 hole so that the end of the flexible tubing 310 extends from the third face of blocks 202, 204. The gripping hole 206 may have a radius approximately that of the flexible tubing 310 or slightly less. The clamp 200 may be loosened to permit this insertion by unscrewing the clamping bolt 210, and may be tightened so that the flexible tubing 310 is gripped securely by screwing the clamping bolt 210 into the central threaded hole 212 of clamp 200.

An appropriate quick disconnect fitting 250 may be selected, an exemplary embodiment of which is illustrated in FIG. 5. The fitting 250 may be inserted into the protruding end of the flexible tubing 310 to the base of the barbed portion 144 of the fitting 250.

The clamp 200 may then be placed against the brace 118, with the third face 226 of blocks 202, 204 and the protruding end of the flexible tubing 310 closest to the second guide plate 112. The trailing portion of the flexible tubing 310 may be slid into the notch 120 in the brace 118, with the protruding end of the flexible tubing 310 coaxially aligned with the fitting 250 and the plunger 108.

The user may squeeze the trigger 104 of the fuel line assembly tool 100 using one hand repeatedly toward the handle 140, in order to move the insert guide 130 into a cavity in the fitting 250. Once the insert guide is inserted, the trigger 104 may be squeezed again to gently force the barbed connecting portion 144 of the fitting 250 into the flexible tubing 310 as illustrated in FIGS. 5 and 6. Because the protruding end of the flexible tubing 310 is tightly gripped and coaxially aligned with the fitting 250 and the plunger 108, the plunger 108 can easily insert the fitting 250 directly, and without skewing, into the protruding end of the flexible tubing 310. Once the fitting 250 is completely inserted, the release tab 124 may be pressed so that the plunger 108 carrying the insert guide 130 may be withdrawn from the fitting 250.

The flexible tubing 310 may then be cut to the appropriate length for use. If the fuel line requires quick release fittings on both ends, the process may be repeated to attach a fitting 250 to the other end of the flexible tubing 310. In other exemplary embodiments, the fitting on a second end of the fuel line may need to be different from the fitting on the first end, and a different fitting or adapter, such as, for example, one described herein, may be attached to the second end of the replacement fuel line.

In the exemplary embodiment, the fuel line assembly tool 100 is used to insert fittings into flexible tubing 310 in order to make replacement fuel lines for automotive vehicles. In other embodiments, such tool 100 may be used to coaxially insert any similar fitting into flexible tubing 310. This may include non-automotive fuel lines or other lines which carry something other than fuel.

In the exemplary embodiment discussed in detail above, the fuel line assembly tool 100 was used in conjunction with a barbed quick disconnect fitting 250. The fuel line assembly tool 100 may also be used with a push on quick disconnect fitting 260. The method of using a fuel line assembly tool 100 to make a replacement fuel line with push on quick disconnect fittings 260 is the same as described above, except that before using the tool to insert the push on quick disconnect fitting 260 into the flexible tubing 310, a hose clamp 360 should be slipped around the flexible tubing 310. After the push on quick disconnect fitting 260 is inserted, the hose clamp 360 is slid into position adjacent the annular protrusion on the quick disconnect fitting 260 and crimping tool 370 may be used to tighten and seal the hose clamp about the flexible tubing 310, thus sealing the flexible tubing to the fitting 260.

In a further exemplary embodiment, a replacement fuel line may be made by manually inserting the push on quick disconnect fitting 260 into the flexible tubing 310 without using the fuel assembly tool 100, and position and crimp the hose clamp 360 as described above.

In some instances different or additional fittings 320, threaded adaptors 330, connecting barbs 340, or metal tubing to flexible tubing adaptors 350, as illustrated in FIGS. 9-13, may be required to provide a complete replacement or repair. Each of the fittings 320, threaded adaptors 330, and metal tubing to flexible tubing adaptors 350 may be attached to flexible tubing 310 by sliding a hose clamp 360 on a portion of flexible tubing 310, inserting the connecting portion or cylindrical extension of the fitting or adaptor into the flexible tubing 310, positioning the hose clamp 360, then using the crimping tool 370 to clamp and seal the hose clamp 360 around the flexible tubing 310 to seal it to the adaptor or fitting. Most adaptors or fittings may be designed with a single annular bulge which permits relatively easy insertion into the flexible tubing, yet permits a tight seal with the flexible tubing 310 with the assistance of a hose clamp 360. Attaching the releasable fittings and adaptors directly to the replacement line permits the owner or mechanic to connect the replacement line in the same manner as the original. Because the replacement fuel line is functionally identical to the original one, it seals more tightly, and can be more easily and reliably used than a length of hose attached directly to the automobile with clamps.

In a further feature of this exemplary embodiment, the fuel line replacement kit 500 contains components that may be used to repair fuel lines rather than replace them. For example one or more flexible tubing to metal tubing compression fittings 420 may be used to attach a replacement length of nylon tubing to a steel fuel line that has a leak in one portion, but which is otherwise solid. The damaged portion of original metal fuel line would be removed leaving at least one metal end connected to an original fitting. Original, as used herein, means the part being replaced or repaired, not necessarily that the part originally came with a new vehicle. In this exemplary embodiment, the metal end would be inserted into the metal end of the flexible tubing to metal tubing compression fitting, and the metal compression fitting tightened. A piece of flexible tubing would be selected or cut and one end of the new piece of flexible tubing would be inserted into the flexible tubing end of the flexible tubing to metal end of the compression fitting, and the flexible tubing compression fitting tightened. In some circumstances, this process may need to be repeated to connect the flexible tubing to a salvageable portion of the other end of the original metal fuel line. In other circumstances, the flexible tubing may be cut to an appropriate length to serve as the remainder of the fuel line and an appropriate fitting attached to the loose end of the flexible tubing.

In other exemplary embodiments, connector barbs 340, combined with hose clamps 360, may be used to replace a portion of flexible tubing 310 in a fuel line, rather than replace the entire fuel line. The damaged portion of a flexible tubing fuel line would be removed, creating two new ends. In this exemplary embodiment, one end of a connector barb would be inserted into one the new ends of the flexible tubing fuel line, and a clamp crimped on the flexible tubing to keep it in place. A piece of new flexible tubing approximately the length of the damaged portion would be selected or cut. As used herein, new is intended to mean new to this particular fuel line, it does not necessarily mean no prior use. The other end of the connector barb would then be inserted into the end of a new piece of flexible tubing, and a clamp crimped around the flexible tubing to keep it in place. The process would be repeated to join the second end of the original fuel line to the new piece of flexible tubing. In some instances, rather than connect the second end to the new piece of flexible tubing, it may be appropriate to cut the new piece of flexible tubing long enough to replace the rest of the old fuel line and to affix an appropriate new fitting on the end of the new piece of flexible tubing.

The above exemplary embodiments of making replacement fuel lines using a fuel line replacement kit are provided for purposes of illustration, not limitation. There are multiple other combinations which use the components of a fuel line replacement kit to create a replacement fuel line, or to repair a damaged one, which will be obvious to those skilled in the art. In addition, although the steps above are recited in an exemplary order, the steps may be performed in a number of different orders to accomplish the same results.

As a further feature of an exemplary embodiment, a fuel line assembly tool 100 may be made from a commercially available caulking gun by removing the stop at the end of the rails from a railed caulking gun and replacing it with a brace as described herein. In addition, the push plate may be removed from the plunger and replaced with an insert guide as described herein. The dimensions of the insert guide may be selected to accommodate the interior shape of the fittings with which it is intended to be used.

In the foregoing description certain terms have been used for brevity, clarity, and understanding; however, no unnecessary limitations are to be implied therefrom, because such terms are used for descriptive purposes and are intended to be broadly construed. Moreover, the descriptions and illustrations herein are by way of examples, and the invention is not limited to the exact details shown and described.

In the following claims, any feature described as a means for performing a function shall be construed as encompassing any means known to those skilled in the art to be capable of performing the recited function and shall not be limited to the structures shown herein or mere equivalents thereof.

Having described the features, discoveries and the principles of the invention, the manner in which it is constructed and operated, and the advantages and useful results attained; the new and useful structures, devices elements, arrangements, parts, combinations, systems, equipment, operations, methods and relationships are set forth in the appended claims.

I claim:

1. An apparatus comprising:

a fuel line assembly tool further comprising:

a plunger comprising an elongated member having first and second ends, an insert guide operatively connected to a second end of said plunger which insert guide is adapted to be inserted in a quick disconnect fitting, a handle including a grip and a trigger which are pivotally connected to each other and biased apart, a plurality of guide plates wherein each guide plate includes at least one hole through each guide plate which is aligned with at least one of the at least one hole through each of the plurality of guide plates and wherein the plurality of guide plates are adapted to permit the plunger to pass through said guide plates and to guide the movement of said plunger, a gripping element operatively connected to said trigger which is adapted to alternately grip adjacent a first end of said plunger and move said plunger through said aligned holes in response to said trigger being pivoted toward said handle and to release said plunger and allow said plunger to remain stationary with respect to said aligned holes when said trigger is released, a plurality of rails comprising elongated members which are generally aligned with said plunger, a clamp adapted to hold flexible tubing comprising two rectangular blocks adapted to be fastened together to form a single block, wherein each block contains at least one half cylindrical groove and wherein said half cylindrical grooves are positioned so that they found a single cylindrical gripping hole through said clamp when said blocks are placed adjacent each other to form a single block, and wherein said gripping hole is characterized by a diameter that is smaller than the diameter of flexible tubing said clamp is adapted to hold, and a brace comprising a plate which has at least one notch adapted to permit flexible tubing to pass through said notch and wherein the said brace is held at a fixed distance from said handle by said plurality of rails, and wherein the plunger, the insert guide, the gripping hole in the clamp, and the notch in the brace are aligned when in use and wherein the trigger is operative to apply in line force through the gripping element to move the plunger toward the brace.

2. The apparatus of claim 1 wherein the plunger and the insert guide are adapted to releasably mate.

3. The apparatus of claim 1 wherein the insert guide comprises a plurality of coaxially aligned cylinders characterized by diameters, which diameters decrease as distance from the second end of the plunger increases, and wherein the cylinders are also each characterized by a height, which height and diameters are adapted to permit the insert guide to be inserted into a plurality of quick release fittings of different sizes.

4. The apparatus of claim 1 wherein the half cylindrical grooves include a friction feature.

5. The apparatus of claim 4 wherein the friction feature comprises a plurality of ridges oriented perpendicularly to the axes of said half cylindrical grooves.

6. The apparatus of claim 1 wherein each of said rectangular blocks comprising said clamp includes a plurality of half cylindrical grooves adapted to form a plurality of gripping holes when said rectangular blocks are placed adjacent each other to form a single block and wherein each of the plurality of gripping holes is characterized by a diameter and wherein each diameter is different from every other diameter.

* * * * *